April 4, 1950     B. E. HOUSE ET AL     2,502,948
BRAKE

Filed April 18, 1946     2 Sheets-Sheet 1

INVENTORS
BRYAN E. HOUSE
RUDOLPH A. GOEPFRICH
BY
T. J. Plante
ATTORNEY

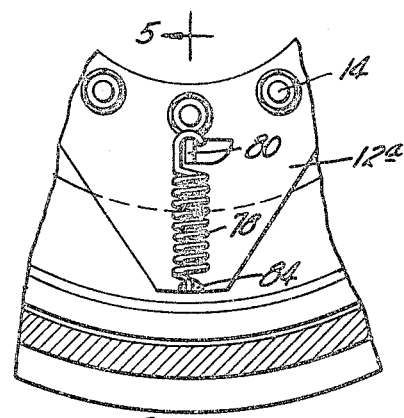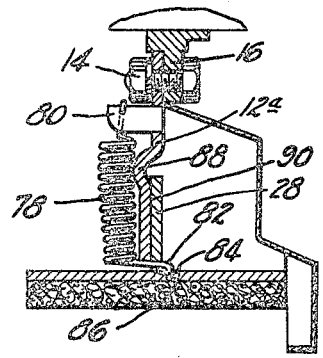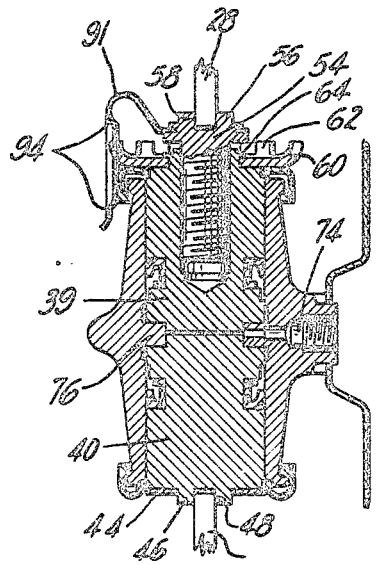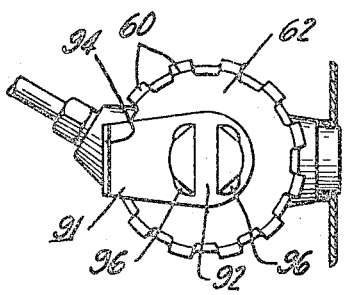

Patented Apr. 4, 1950

2,502,948

UNITED STATES PATENT OFFICE 2,502,948

BRAKE

Bryan E. House and Rudolph A. Goepfrich, South Bend, Ind., assignors to Bendix Aviation Corporation, South Bend, Ind., a corporation of Delaware Application April 18, 1946, Serial No. 663,084

19 Claims. (Cl. 188—78)

This invention relates to brakes, and is particularly concerned with a construction and arrangement of brakes whereby proper relative positions of the brake members are continuously maintained.

An object of the present invention is to provide improved and simplified means for laterally positioning and guiding the brake shoes of a drum brake assembly.

A related object is to simplify the construction of the brake support member or spider, by limiting the spider guiding effect on each shoe to a single limited surface area.

A further object of the present invention is to provide an improved and simplified brake construction of the type in which the anchoring and applying loads exert little or no twisting force on the spider, due to the centering of said loads in the torque reaction plane.

A further object of the present invention is to provide novel mechanism for adjusting the release position of the shoes, said mechanism being particularly adapted to assist in lateral guiding of the shoes.

A further object of the present invention is to provide brake return springs having the dual function of biasing the shoes to released position, and of urging the shoes laterally against the locating surfaces provided on the support member.

A feature of the invention is the utilization of a single sheet metal member to accomplish the dual function of serving as a hardened thrust member between a shoe and its adjusting mechanism and of yieldably locking said adjusting mechanism in its adjusted position.

Other objects, features, and advantages of the present invention will become apparent during the course of the following description, refeernce being had therein to the accompanying drawings, in which:

Figure 4 is a partial side elevation of a brake assembly showing a modification of the arrangement of Figure 1;

Figure 5 is a section taken on the line 5—5 of Figure 4;

Figure 6 is an enlarged sectional view taken on the line 6—6 of Figure 1, showing more clearly a certain feature of the construction; and Figure 7 is an enlarged end view of the adjusting mechanism of Figure 6.

Figure 1:
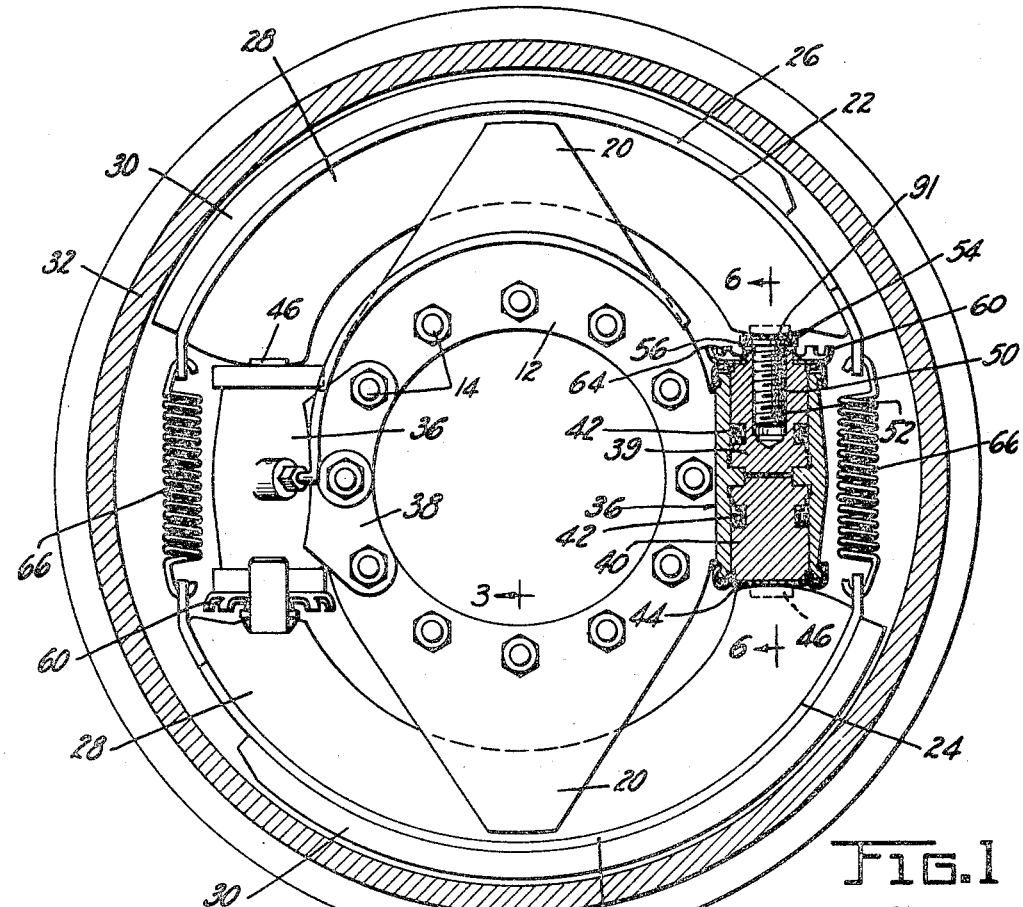
Figure 1 is a side elevation of a brake assembly, showing one of the wheel cylinders in section.
Figure 2:
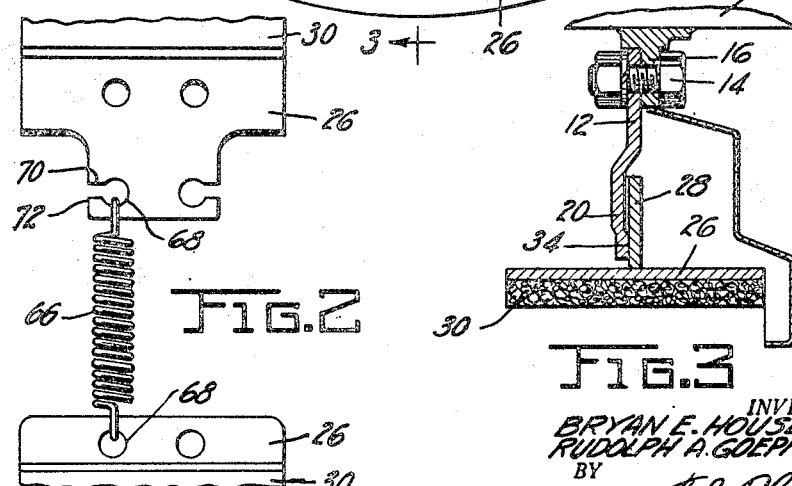
Figure 2 is an end view of the brake assembly, showing the offset relationship of the return spring with the shoes.
Figure 3:
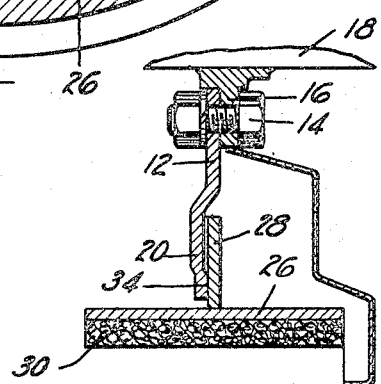
Figure 3 is a section taken on the line 3—3 of Figure 1.

An improved and simplified shoe guiding arrangement is illustrated in Figures 1 to 3.

The support member or spider 12, which is secured by a plurality of bolts 14 to the flange 16 of axle housing 18, is provided with only two shoe guiding arms 20. These arms are located diametrically opposite one another, and each serves as the sole contact between the spider and one of the shoes. The upper spider arm 20 contacts the web of shoe 22, and the lower spider arm 20 contacts the web of shoe 24. The shoes are of the conventional T-section type, each having a curved rim 26 and a strengthening web 28 perpendicular to the rim and located at the center thereof. The rims are provided with the usual lining material 30, which directly engages the rotating drum 32 during braking.

In order that the webs of the shoes may lie in the plane of the annular central portion of the spider, thereby avoiding offset loading or twisting action on the spider, the arms 20 are slightly axially offset from the body of the spider, as shown in Figure 3. The outer end of each spider arm 20 is provided with a side surface 34 which engages the web of the respective shoe to determine its lateral position with respect to the rest of the brake assembly.

The shoes must also be guided at their ends, a function which will shortly be explained.

The applying and anchoring means for the shoes consists of two wheel cylinders or actuators 36, located at opposite sides of the brake assembly. Each of the wheel cylinders is provided with an integral flange 38, by means of which it is firmly secured to the spider 12.

Reciprocable within each wheel cylinder are two pistons, which are operatively associated with the ends of the shoes in order to exert an applying force on said shoes. The construction of the two wheel cylinders is identical, and therefore only the right hand cylinder is shown in section. Description of the sectioned cylinder is applicable to both.

Two pistons 39 and 40 are shown, each provided with a suitable annular seal 42. The piston 40 engages directly with the adjacent shoe end, except for the presence of a hardened metal thrust member 44, which protects the outer end of the piston and thus reduces wear. Piston 40 has a reduced diameter outer extension 46 which is slotted at 48 (see Figure 6) to receive one end of a shoe web.

The other piston 39 differs from piston 40 in being provided with means for adjusting the released position of the respective shoe. An internally threaded hole or bore 50 extends inwardly from the outer end of piston 39, and receives the stem 52 of an adjusting screw 54. The head 56 of the adjusting screw has a slot 58 (see Figure 6) which receives one end of a shoe web.

Adjustment of the shoe position is accomplished by rotating the piston 39, the adjusting screw being prevented from rotating by its engagement with the shoe. In order to permit engaging the piston to rotate it, the outer end of the piston is provided with a toothed or ratcheted surface, as shown. The teeth 60 (see particularly Figure 7) may be formed as part of an annular sheet metal member 62, which is secured to the piston by shear riveting the outer end of the piston to form the rivet nibs 64.

From the foregoing, it will be seen that each shoe is guided at three points, at the center by contact with the spider, at one end by engaging the slot of a piston, and at the other end by engaging the slot of an adjusting screw. Upper shoe 22 is guided by the upper spider arm, by the slot in the upper piston of the left hand wheel cylinder, and by the slot in the adjusting screw of the right hand wheel cylinder. Lower shoe 24 is guided by the lower spider arm, by the slot in the adjusting screw of the left hand wheel cylinder, and by the slot in the lower piston of the right hand wheel cylinder.

In order to firmly hold the shoes in the proper lateral position provided by the guiding means, thereby preventing cocking or misalignment of the shoes, a novel return spring arrangement is provided. Located between the ends of the shoes and outwardly beyond the wheel cylinders are the return spring 66, which are in tension between the ends of the shoes to bias them to released or retracted position. The springs 66, as shown in Figure 2, are offset laterally from the center of the brake shoes, i. e., offset from the plane of the shoe webs. The springs, therefore, lie on the opposite side of the spider arms 20 from the shoe engaging surfaces 34 of the spider arms, with the result that the tension of the springs exerts a lateral force on the shoes holding them firmly in engagement with the spider arms.

As shown in Figure 2, the shoe rims are extended to provide hooking holes 68 for the springs 66, and one of the hooking holes may have a slot 70 running to the edge of the rim in order to simplify the job of installing the springs. By extending a prying tool through the loop of the spring and fulcruming the tool on the edge 72 of the slot, the spring can be easily slipped into place by lifting the end of the tool. The extra spring holes are provided to make the shoes universally usable.

In applying the brake, liquid under pressure is admitted through an inlet 74 of each of the cylinders to the chamber between the cylinder pistons, forcing the pistons outwardly, and urging both ends of both shoes toward the drum. As the shoes engage the drum, the frictional force causes them to rotate with the drum until they reach anchored position.

The anchoring torque of the shoes is transmitted through the respective pistons to the internal annular anchoring flange 76, which is an integral part of each wheel cylinder. The torque is thence transferred from the cylinders to the spider and the axle housing or other non-rotating part.

The anchor flanges 76 serve also as positioning means or locators for the brake members in released position, limiting the retractile movement of the shoes under the influence of the return springs.

Figures 4 and 5 illustrate a somewhat different arrangement of the return springs. In this case, each spring 78 is located at the center of the respective shoe, and has one end hooked to a lateral projection 80 formed integrally with the spider 12a, and the other end hooked to the shoe by means of an arm 82 which extends through an opening 84 in the shoe web into an opening 86 in the shoe rim. The spring 78 is laterally deflected by the boss 88 formed in the spider to provide a sufficient lateral component holding the side of the shoe web 28 against the surface 90 of the spider arm.

Referring again to the brake assembly shown in Figures 1 to 3, 6 and 7, and particularly to the latter two figures, an additional feature consists in the provision of a member which serves both as a wear reduction means for the adjusting screw, and as a yieldable lock for the adjusting mechanism. A single sheet metal member 91 provides both the thin body portion 92, which serves as a hardened thrust member between the end of the shoe and the bottom of the adjusting screw slot 58, and also the resilient laterally extending arm 94 which is formed to engage the teeth 60 and yieldably restrain the piston against rotation relative to the adjusting screw. As shown in Figure 7, the body portion 92 of member 91 is formed with two crescent-shaped slots to fit over the slotted end of the adjusting screw, and the parts are secured together by shear riveting to form the nibs 96 on the adjusting screw head.

The arm 94 of the member 91 has sufficient inherent resilience to permit easy manual operation of the adjusting mechanism, while preventing any change of adjustment due to vibrations or other disturbances during operation of the vehicle on which the brake is installed.

Although particular embodiments of our invention have been described, it will be understood by those skilled in the art that the object of the invention may be attained by the use of constructions different in certain respects from those disclosed without departing from the underlying principles of the invention. We therefore desire by the following claims to include within the scope of our invention all such variations and modifications by which substantially the results of our invention may be obtained through the use of substantially the same or equivalent means.

We claim:

1. A brake comprising a support member consisting of a plate-like stamping having two diametrically opposite radially extending guide arms bent slightly away from the plane of the center portion of the plate, two actuating cylinders carried by the support plate, said actuators being located opposite one another and being located in a circumferential sense approximately midway between the two guide arms, the axes of said actuators lying in the plane of the center portion of the support plate, two pistons reciprocable in each of said actuators, one of which has a guide slot in its outer end, and the other of which has a threaded opening in its outer end and a toothed wheel supported on its outer periphery, an adjusting screw in threaded engagement with the opening in said piston and having a head provided with a guide slot in its outer surface, said adjusting screw being moved axially relative to the piston by means of rotation of the toothed wheel, which causes the piston to rotate with it, two T-section brake shoes having their strengthening webs located in the plane of the center portion of the support plate, each shoe web being guided by engaging the respective guide arm of the support plate over an appreciable contact surface and by having one end extending into the slot in the piston of one of the hydraulic actuators and the other end extending into the slot in the adjusting screw head of the other hydraulic actuator, and a plurality of springs acting on said shoes to urge them to retracted position, said springs exerting force along lines offset from the plane of the shoe webs so as to cause the spring force to maintain the shoes in engagement with the support plate guide arms.

2. A brake comprising a support plate having a radially extending guide arm bent slightly away from the plane of the center portion of the plate, two hydraulic actuators carried by the support plate member, the axes of said actuators lying in the plane of the center portion of the support plate, a piston reciprocable in each of said actuators, one of which has a guide slot in its outer end, and the other of which has a threaded opening in its outer end and a toothed outer periphery, an adjusting screw in threaded engagement with the opening in said piston and having a head provided with a guide slot in its outer surface, said adjusting screw being moved axially relative to the piston by means of rotation of the toothed piston surface, a T-section brake shoe having its strengthening web located in the plane of the center portion of the support plate, said shoe web being guided by engaging the guide arm of the support plate and by having one end extending into the piston slot and the other end extending into the adjusting screw slot, and spring means acting on said shoe to urge it to retracted position, said spring means exerting force along a line offset from the plane of the shoe web so as to cause the spring force to maintain the shoe in engagement with the support plate guide arm.

3. A brake comprising a support member having an outwardly extending guide arm, two hydraulic actuators carried by the support member, a piston reciprocable in each of said actuators, one of which has a guide slot in its outer end, and the other of which has a threaded opening in its outer end and a toothed outer periphery, an adjusting screw in threaded engagement with the opening in said piston and having a head provided with a guide slot in its outer surface, said adjusting screw being moved axially relative to the piston by means of rotation of the toothed piston surface, a T-section brake shoe having its web guided by engaging the guide arm of the support member and by having one end extending into the piston slot and the other end extending into the adjusting screw slot, and spring means acting on said shoe to urge it to retracted position, said spring means exerting force along a line offset from the plane of the shoe web so as to cause the spring force to maintain the shoe in engagement with the guide arm of the support member.

4. A brake comprising a support member having an outwardly extending guide arm, two hydraulic actuators carried by the support member, a piston reciprocable in each of said actuators, one of which has a guide slot in its outer end, and the other of which has a threaded opening in its outer end and a toothed outer periphery, an adjusting screw in threaded engagement with the opening in said piston and having a head provided with a guide slot in its outer surface, said adjusting screw being moved axially relative to the piston by means of rotation of the toothed piston surface, a T-section brake shoe having its web guided by engaging the guide arm of the support member and by having one end extending into the piston slot and the other end extending into the adjusting screw slot, and a resilient member associated with said screw engaging said toothed periphery to hold the piston in its adjusted position and serving as a thrust member between said screw and the corresponding end of said web.

5. A brake comprising a support member, two hydraulic actuators carried by the support member, a piston reciprocable in each of said actuators, one of which has a guide slot in its outer end, and the other of which has a threaded opening in its outer end and a toothed outer periphery, an adjusting screw in threaded engagement with the opening in said piston and having a head provided with a guide slot in its outer surface, said adjusting screw being moved axially relative to the piston by means of rotation of the toothed piston surface, a T-section brake shoe having its web guided by having one end extending into the piston slot and the other end extending into the adjusting screw slot, and a member associated with said screw providing a thrust member between said screw and said other end of said web and having a resilient portion engaging said toothed periphery to hold the piston in its adjusted position.

6. A brake comprising a support member consisting of a plate-like stamping having two diametrically opposite radially extending guide arms bent slightly away from the plane of the center portion of the plate, two hydraulic actuators carried by the support plate, said actuators being located opposite one another and being located in a circumferential sense approximately midway between the two guide arms, the axes of said actuators lying in the plane of the center portion of the support plate, two reciprocable members in each of said actuators, said reciprocable members being provided at the outer ends thereof with guide slots, two T-section brake shoes having their strengthening webs located in the plane of the center portion of the support plate, each shoe web being guided by engaging the respective guide arm of the support plate over an appreciable contact surface and by having its ends extending into the guide slots of the respective reciprocable members, there being only a single support plate guide arm associated with each shoe web, and two return springs each in tension between one end of one shoe and the adjacent end of the other shoe, and each located radially outwardly beyond the adjacent hydraulic actuator, said return springs being connected to the rims of the shoes and being laterally offset from the plane of the shoe webs in a direction such that the spring force will maintain the shoes in engagement with the support plate guide arms.

7. A brake comprising a support plate having a radially extending guide arm bent slightly away from the plane of the center portion of the plate, two actuating cylinders carried by the support plate, the axes of said cylinders lying in the plane of the center portion of the support plate, a reciprocable member in each of said cylinders, said reciprocable members being provided at the outer ends thereof with guide slots, a T-section brake shoe having its strengthening web located in the plane of the center portion of the support plate, said shoe web being guided by engaging the guide arm of the support plate and by having its ends extending into the guide slots of the reciprocable members, there being only a single support plate guide arm associated with said shoe web, and two return springs, each connected to one end of the shoe, and each located radially outwardly beyond the adjacent hydraulic actuator, said return springs being connected to the rim of the shoe and being laterally offset from the plane of the shoe web in a direction such that the spring force will maintain the shoe in engagement with the support plate guide arm.

8. A brake comprising a support member having an outwardly extending guide arm, two actuators carried by the support member, a reciprocable member in each of said actuators, said reciprocable members being provided at the outer ends thereof with guide slots, a T-section brake shoe having its strengthening web guided by engaging the guide arm of the support member and by having its ends extending into the guide slots of the reciprocable members, there being only a single support plate guide arm associated with said shoe web, and two return springs, each connected to one end of the shoe, and each located radially outwardly beyond the adjacent actuator, said return springs being connected to the rim of the shoe and being laterally offset from the plane of the shoe web in a direction such that the spring force will maintain the shoe in engagement with the support plate guide arm.

9. A brake comprising a support member having two oppositely-located guide surfaces, two T-section brake shoes having their strengthening webs guided by engaging the guide surfaces of the support member, and two return springs, each interconnecting the rims of the two shoes at one end thereof and each laterally offset from the plane of the shoe webs in a direction such that the spring force will maintain the shoes in engagement with the support plate guide arms.

10. A brake comprising a support member having two oppositely-located guide surfaces, two T-section brake shoes having their strengthening webs guided by engaging the guide surfaces of the support member, and a return spring interconnecting the rims of the two shoes at one end thereof and laterally offset from the plane of the shoe webs in a direction such that the spring force will maintain the shoes in engagement with the support plate guide arms.

11. A brake comprising a support member consisting of a plate-like stamping having two diametrically opposite radially extending guide arms bent slightly away from the plane of the center portion of the plate, two hydraulic actuators carried by the support plate, said actuators being located opposite one another and being located in a circumferential sense approximately midway between the two guide arms, the axes of said actuators lying in the plane of the center portion of the support plate, two reciprocable members in each of said actuators, said reciprocable members being provided at the outer ends thereof with guide slots, two T-section brake shoes having their strengthening webs located in the plane of the center portion of the support plate, each shoe web being guided by engaging the respective guide arm of the support plate over an appreciable contact surface and by having its ends extending into the guide slots of the respective reciprocable members, there being only a single support plate guide arm associated with each shoe web, and a plurality of springs acting on said shoes to urge them to retracted position, said springs exerting force along lines offset from the plane of the shoe webs so as to cause the spring force to maintain the shoes in engagement with the support plate guide arms.

12. A brake comprising a support plate having a radially extending guide arm bent slightly away from the plane of the center portion of the plate, two actuating cylinders carried by the support plate, the axes of said cylinders lying in the plane of the center portion of the support plate, a reciprocable member in each of said cylinders, said reciprocable members being provided at the outer ends thereof with guide slots, a T-section brake shoe having its strengthening web located in the plane of the center portion of the support plate, said shoe web being guided by engaging the guide arm of the support plate and by having its ends extending into the guide slots of the reciprocable members, there being only a single support plate guide arm associated with said shoe web, and spring means acting on said shoe to urge it to retracted position, said spring means exerting force along a line offset from the plane of the shoe web so as to cause the spring force to maintain the shoe in engagement with the support plate guide arm.

13. A brake comprising a support member having an outwardly extending guide arm, two actuators carried by the support member, a reciprocable member in each of said actuators, said reciprocable members being provided at the outer ends thereof with guide slots, a T-section brake shoe having its strengthening web guided by engaging the guide arm of the support member and by having its ends extending into the guide slots of the reciprocable members, there being only a single support plate guide arm associated with said shoe web, and spring means acting on said shoe to urge it to retracted position, said spring means exerting force along a line offset from the plane of the shoe web so as to cause the spring force to maintain the shoe in engagement with the guide arm of the support member.

14. A brake comprising a support member having an outwardly extending guide arm, a T-section brake shoe having its strengthening web guided by engaging the guide arm of the support member, there being only a single support member guide arm associated with said web, and spring means acting on said shoe to urge it to retracted position, said spring means exerting force along a line offset from the plane of the shoe web so as to cause the spring force to maintain the shoe in engagement with the guide arm of the support member.

15. In a brake, a support member having an outwardly extending guide arm, a T-section shoe having its web in engagement with one side of said guide arm, and a tension spring connected at one end to the shoe and at the other end to the support member and lying against the side of the guide arm opposite the shoe-engaging side.

16. In a brake, two T-section shoes, each having a rim provided with a spring hole located near one end of the rim and offset laterally from the plane of the shoe web, the spring hole of one of the shoe rims having a slot extending to the adjacent edge of the shoe rim, and a return spring having its opposite ends hooked into the spring holes of the respective shoes.

17. For use as a brake shoe applying and adjusting means, a piston having a threaded opening in its outer end and a toothed outer periphery, an adjusting screw in threaded engagement with the opening in said piston and having a head provided with a guide slot in its outer surface to receive the edge of the shoe, said adjusting screw being moved axially relative to the piston by means of rotation of the toothed piston surface, and a sheet metal member having a slotted arm which fits over the adjusting screw head to provide a hardened surface between the shoe edge and the bottom of the guide slot and having an integral laterally extending inherently resilient arm which engages the toothed periphery of the piston to yieldably restrain rotation of the piston.

18. For use in combination with a brake shoe, a piston which is adapted to actuate the shoe and which has a toothed periphery by means of which the piston can be rotated, an adjusting screw which is carried by the piston and which engages the shoe, the adjusting screw being arranged to vary the position of the shoe with respect to the piston as the piston is rotated, and a member having a flat portion which serves as a thrust connection between the shoe and the adjusting screw and an integral arm which engages the peripheral teeth provided on the piston to yieldably retain the piston in a given adjusted position.

19. For use as a brake shoe applying and adjusting means, a piston having an opening in its outer end and a toothed outer periphery, an adjusting member removably secured in said opening and having a head provided with a slot in its outer surface to receive the edge of the shoe, said adjusting member being moved axially relative to the piston by means of rotation of the toothed piston surface, and a thrust member fitted over the slotted head of said adjusting member to lie between the bottom of said slot and the corresponding end of the shoe web having an integral resilient arm in engagement with said toothed surface to hold the brake shoe in adjusted position.

BRYAN E. HOUSE.
RUDOLPH A. GOEPFRICH.

REFERENCES CITED

The following references are of record in the file of this patent:

UNITED STATES PATENTS

| Number | Name | Date |
|---|---|---|
| 2,149,651 | White | Mar. 7, 1939 |
| 2,224,215 | Chartock et al. | Dec. 10, 1940 |
| 2,239,916 | Hunt | Apr. 29, 1941 |
| 2,245,682 | Kerr | June 17, 1941 |
| 2,322,121 | Frank | June 15, 1943 |
| 2,329,095 | White | Sept. 7, 1943 |
| 2,345,108 | Goepfrich | Mar. 28, 1944 |
| 2,381,737 | Goepfrich | Aug. 7, 1945 |
| 2,429,815 | House | Oct. 28, 1947 |